(12) United States Patent
Zhu et al.

(10) Patent No.: US 8,859,690 B2
(45) Date of Patent: Oct. 14, 2014

(54) BIODEGRADABLE COMPOSITE, THE PREPARATION PROCESS THEREOF, AND A DISPOSABLE ARTICLE MADE THEREFROM

(75) Inventors: Guixiang Zhu, Beijing (CN); Wei Zhang, Beijing (CN); Ling Han, Beijing (CN); Ning Xu, Beijing (CN); Yi Zou, Beijing (CN); Wenxi Ji, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 17 days.

(21) Appl. No.: 13/531,292

(22) Filed: Jun. 22, 2012

(65) Prior Publication Data

US 2012/0329924 A1 Dec. 27, 2012

(30) Foreign Application Priority Data

Jun. 23, 2011 (CN) .......................... 2011 1 0173428

(51) Int. Cl.
| C08G 63/91 | (2006.01) |
| C08L 67/02 | (2006.01) |
| C08L 67/04 | (2006.01) |
| C08K 5/14 | (2006.01) |

(52) U.S. Cl.
CPC . C08L 67/02 (2013.01); C08K 5/14 (2013.01); C08L 2205/02 (2013.01); C08L 2205/03 (2013.01); C08L 67/04 (2013.01)
USPC .......................................................... 525/411

(58) Field of Classification Search
USPC .................. 525/410, 411, 415, 444, 448, 450
See application file for complete search history.

(56) References Cited

U.S. PATENT DOCUMENTS

| 2005/0192377 A1 | 9/2005 | Scheer et al. |
| 2006/0142536 A1 | 6/2006 | Chen et al. |
| 2006/0263394 A1 | 11/2006 | Oyama et al. |
| 2008/0281018 A1 | 11/2008 | Seelinger et al. |
| 2009/0157020 A1 * | 6/2009 | Shi et al. ....................... 604/359 |
| 2010/0112357 A1 | 5/2010 | Fine et al. |
| 2012/0220680 A1 * | 8/2012 | Bastioli et al. ................. 521/182 |
| 2012/0232191 A1 * | 9/2012 | Auffermann et al. ............. 524/5 |

FOREIGN PATENT DOCUMENTS

| CN | 1898325 A | 1/2007 |
| CN | 101056938 A | 10/2007 |
| CN | 101265356 A | 9/2008 |
| CN | 101495568 | 7/2009 |
| CN | 101875763 | 11/2010 |
| JP | 2001026658 A | 1/2001 |
| WO | WO 2011054786 A1 * | 5/2011 |
| WO | WO 2011054926 A1 * | 5/2011 | ............. C08G 63/16 |

OTHER PUBLICATIONS

Coltelli, M.B., et al.; Polymer Degradation and Stability, 2010, vol. 95, p. 332-341.*

* cited by examiner

*Primary Examiner* — Robert Jones, Jr.
(74) *Attorney, Agent, or Firm* — Novick, Kim & Lee, PLLC; Allen Xue

(57) ABSTRACT

The present invention relates to a biodegradable composite and its preparation process, which composite is prepared by mixing feed stocks comprising a polylactic acid, an aliphatic-aromatic copolyester A, an aliphatic-aromatic copolyester B and an organic peroxide at a temperature between about 100 and about 200° C. The present invention also relates to a disposable article, which is prepared from said biodegradable composite.

26 Claims, No Drawings

BIODEGRADABLE COMPOSITE, THE PREPARATION PROCESS THEREOF, AND A DISPOSABLE ARTICLE MADE THEREFROM

RELATED APPLICATION

This application claims the benefit of Chinese Patent Application No. 201110173428.2 filed Jun. 23, 2011, which is hereby incorporated by reference herein in its entirety.

FIELD OF THE INVENTION

The present invention relates to a biodegradable composite, the preparation process thereof, and a disposable article produced from aforesaid biodegradable composite.

BACKGROUND OF THE INVENTION

As a biodegradable material from biomass resources, polylactic acid gets rid of the unique dependence on the petroleum resource, and can completely degrade under the action of micro-organism and finally become carbon dioxide and water, therefore it meets the need of environment protection and no any other material can compete with it in consideration of its outstanding low carbon charge, biocompatibility, biodegradability, good mechanical and service performances. However, the defects of the brittle character due to its relatively high glass temperature (about 50-60° C.) and bad heat tolerance due to its low softening point greatly limit the application of a polylactic acid. Therefore, domestic and oversea researchers have carried out massive investigations on the improvement of the toughness and heat tolerance of a polylactic acid.

The toughening of a polylactic acid is carried out mainly by copolymerizing and blending. Copolymerizing has the defects of complicated technology, long production period, high, cost, difficult implementing and continuous industrialized production, while to the contrary, blending is easily realized. Therefore, toughening of a polylactic acid is carried out mainly by blending using the existing device.

A kind of toughening agent is rubber-type elastic materials such as a copolymer of methyl methacrylate-betandiene-styrene used in CN 101875763A, and ethylene copolymer or olefin compounds with epoxy functional group as an impact resistant and toughening modifier used in CN 101495568A, US Pat. Pub. No. 2010/0112357, and US Pat. Pub. No. 2006/0263394, etc.

Moreover, it is preferable to use biodegradable materials as toughening agent of a polylactic acid. For example, US Pat. Pub. No. 2008/0281018 mentions a mixture of biodegradable polyesters comprising an aliphatic-aromatic copolyester A, an aliphatic-aromatic copolyester B, other biodegradable polyesters, and compounds with epoxy functional group, wherein Composites comprising an aliphatic-aromatic copolyester A, an aliphatic-aromatic copolyester B, a polylactic acid, and compounds with epoxy functional group are contained.

SUMMARY OF THE INVENTION

According to the first aspect of the present invention, a biodegradable composite is provided, which is prepared by mixing feed stocks comprising a polylactic acid, an aliphatic-aromatic copolyester A, an aliphatic-aromatic copolyester B, and an organic peroxide at a temperature between about 100° C. and about 200° C.;

said aliphatic-aromatic copolyester A is formed by the reaction of feed stocks for esterification, which feed stocks include: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ alicyclic dibasic alcohols, (c) at least one selected from the group consisting of polyhydric alcohols with functionality of greater than about 2, polybasic carboxylic acids with functionality of greater than about 2, and anhydrides of polybasic carboxylic acids with functionality of greater than about 2;

said aliphatic-aromatic copolyester B is a random copolymer comprising repeated structure unit (I) and repeated structure unit (II),

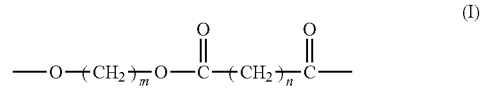

(I)

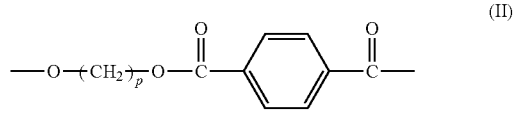

(II)

wherein the molar ratio of structure unit (I) to structure unit (II) is about 1:about 0.1-10, m is 2-10, n is 2-8, and p is 2-10, and the weight-average molecular weight of said aliphatic-aromatic copolyester B is about 100000-about 600000.

According to the second aspect of the present invention, a process for preparing the biodegradable composite is provided, which comprises mixing feed stocks comprising a polylactic acid, an aliphatic-aromatic copolyester A, an aliphatic-aromatic copolyester B, and an organic peroxide at a temperature between about 100° C. and about 200° C., which comprises the following steps:

(1) said aliphatic-aromatic copolyester A is formed by the reaction of feed stocks for esterification, which comprise at least one selected from the group consisting of: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ aliphatic dibasic alcohols, (c) at least one selected from the group consisting of polyhydric alcohols with functionality of greater than 2, polybasic carboxylic acids with functionality of greater than 2, and anhydrides of polybasic carboxylic acids with functionality of greater than 2;

(2) mixing feed stocks comprising a polylactic acid, an aliphatic-aromatic copolyester A made in step (1), an aliphatic-aromatic copolyester B and an organic peroxide at a temperature between about 100 and about 200° C., wherein said aliphatic-aromatic copolyester B is a random copolymer comprising repeated structure unit (I) and repeated structure unit (II),

(I)

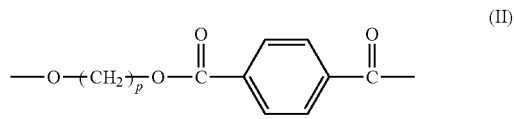

(II)

wherein the molar ratio of the repeated structure unit (I) to the repeated structure unit (II) is about 1:about 0.1-10, m is 2-10, n is 2-8, and p is 2-10, and the weight-average molecular weight of said aliphatic-aromatic copolyester B is about 100000 to about 600000.

According to the third aspect of the present invention, a disposable article is provided, which is prepared from a biodegradable composite, and said biodegradable composite is the afore-mentioned biodegradable composite or the biodegradable composite prepared according to the afore-said process of the present invention.

On one hand, said organic peroxide in said biodegradable composite can enhance the compatibility of a polylactic acid with an aliphatic-aromatic copolyester A, an aliphatic-aromatic copolyester B, and therefore can extend the chain, improve compatibility, and meanwhile, can effectively enhance the toughness of the composite. Moreover, an aliphatic-aromatic copolyester A, an aliphatic-aromatic copolyester B in the biodegradable composite themselves possess a good biodegradable performance, allowing said biodegradable composite to possess an excellent biodegradable performance. Besides, the organic peroxide in said biodegradable composite is non-toxic, so said biodegradable composite exerts no negative effect on the environment friendly.

On the other hand, in addition to possess an excellent biodegradable performance, said biodegradable composite can obviously enhance the impact resistance and tensile strength, and therefore it can be used for preparing membrane articles, molding articles, foaming articles, sheet articles, etc., especially disposable articles by extrusion mold blowing, membrane drawing, bottle blowing, injection molding, foaming, tableting. Said biodegradable composite possesses excellent biodegradable performance, so the product prepared from the biodegradable composite (e.g., a disposable article) can degrade by conventional biodegrading methods (e.g., composting) and therefore no environment pollution is resulted.

DETAILED DESCRIPTION

According to the first aspect of the present invention, a biodegradable composite is provided. Said biodegradable composite can be prepared by mixing feed stocks comprising a polylactic acid, an aliphatic-aromatic copolyester A, an aliphatic-aromatic copolyester B and an organic peroxide at a temperature between about 100° C. and about 200° C. Said mixing temperature can be a temperature between about 100° C. and about 170° C.

In an embodiment, said biodegradable composite is prepared by adding feed stocks comprising a polylactic acid, an aliphatic-aromatic copolyester A, an aliphatic-aromatic copolyester B, and an organic peroxide into a twin-screw extruder to carry out said mixing, and then tableting. For example, the temperature from the feed inlet to the outlet of the twin-screw extruder can successively be about 100 to about 105° C., about 165 to about 170° C., about 165 to about 170° C., and about 160 to about 165° C.

In an embodiment, said polylactic acid can be any conventional one. For example, said polylactic acid is L-polylactic acid (PLLA), or a mixture of L-polylactic acid (PLLA) with D-polylactic acid (PDLA). The content of L-polylactic acid in said polylactic acid can be about 50-about 100% by weight.

In an embodiment, said polylactic acid can be any commercially available one. For example, the number-average molecular weight of said polylactic acid can be about 50000-about 200000, and it can be a polylactic acid product of 4042D purchased from Nature Works LLC Company.

In an embodiment, said aliphatic-aromatic copolyester A and aliphatic-aromatic copolyester B have a ratio by weight of about 2:8 to about 8:2, such as about 3:7 to about 7:3, about 4:6 to about 6:4.

In an embodiment, said aliphatic-aromatic copolyester A can be formed by the reaction of feed stocks for esterification, which include: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ alicyclic dibasic alcohols, (c) at least one selected from the group consisting of polyhydric alcohols with functionality of greater than about 2, polybasic carboxylic acids with functionality of greater than about 2, and acid anhydrides of polybasic carboxylic acids with functionality of greater than about 2.

Said $C_8$-$C_{20}$ aromatic dibasic acids can be one or more selected from the group consisting of $C_8$-$C_{20}$ aromatic dibasic acids, $C_8$-$C_{20}$ aromatic dibasic acid anhydrides, and esters of $C_8$-$C_{20}$ aromatic dibasic acids. For example, said $C_8$-$C_{20}$ aromatic dibasic acid is one or more selected from the group consisting of m-phthalic acid, dimethyl m-phthalate, p-phthalic acid, dimethyl p-phthalate, o-phthalic acid, dimethyl o-phthalate, o-phthalic anhydride, 2.6-naphthalene dicarboxylic acid, dimethyl 2,6-naphthalene dicarboxylate, 1,5-naphthalene dicarboxylic acid, dimethyl 1,5-naphthalene dicarboxylate, 2,7-naphthalene dicarboxylic acid, dimethyl 2,7-naphthalene dicarboxylate, 4,4'-biphenyldicarboxylic acid, dimethyl 4,4'-biphenyldicarboxylate, 3,4'-biphenyldicarboxylic acid, dimethyl 3,4'-biphenyldicarboxylate. For example, said $C_2$-$C_{20}$ aromatic dibasic acid is p-phthalic acid and/or dimethyl p-phthalate, Said $C_2$-$C_{20}$ aliphatic dibasic acid can be one or more selected from the group consisting of $C_2$-$C_{20}$ aliphatic dibasic acids, $C_3$-$C_{10}$ alicyclic dibasic acids, the esters and acid anhydrides thereof. For example, said $C_2$-$C_{20}$ aliphatic dibasic acid is one or more selected from the group consisting of succinic acid, succinic anhydride, dimethyl adipate, adipic acid, adipic anhydride, azelaic acid, sebacic acid, dodecanedicarboxylic acid, 1,4-cyclohexanedicarboxylic acid, 1,2,4,5-cyclohexanetetracarboxylic dianhydride, dimethyl 1,4-cyclohexanedicarboxylic acid, and norbornanedicarboxylic acid; e.g., at least one selected from the group consisting of succinic acid, adipic acid, and sebacic acid.

The component (b) can be at least one or more selected from the group consisting of $C_2$-$C_{10}$ aliphatic dibasic alcohols and/or alicyclic dibasic alcohols, e.g., ethylene glycol, diethylene glycol, propanediol, butanediol, pentanediol, hexanediol, cyclohexanediol, and norbornanedimethanol; e.g., one or more selected from the group consisting of propanediol, butanediol, pentanediol, and hexanediol.

There is no special limitation to component (c), as long as it has more than 3 active functional groups. In the present invention, "active group" means a functional group able to conduct polycondensation reaction with hydroxyl and/or carboxyl groups.

The polyhydric alcohol with functionality greater than about 2 in component (c) means an organic compound with at least 2 hydroxyl groups, and said polyhydric alcohol can also have one or more carboxyl groups or other active groups. Similarly, said polybasic carboxylic acid with functionality greater than about 2 means an organic compound with at least 2 carboxyl groups, and polybasic carboxylic acid can also have one or more hydroxyl groups or other active groups.

In an embodiment, said component (c) is one or more selected from the group consisting of tartaric acid, citric acid, hydroxybutanediacid, trimethylolpropane, trimethylolethane, pentaerythritol, polyethertriol, glycerol, 1,3,5-benzenetriacid, trimellitic acid, trimellitic anhydride, pyromellitic acid, pyromellitic acid dianhydride, and hydroxy-m-benzenediacid, e.g. at least one selected from the group consisting of glycerol, pentaerythritol, pyromellitic acid dianhydride, There is no special limitation to the amount of component (a), component (b), and component (c) in said feed stocks for esterification, as long as they can form an aliphatic-aromatic copolyester A, an aliphatic-aromatic copolyester B after said mixing. For example, the molar ratio of component (a) to component (b) can be about 1:about 0.5-2.5, e.g. about 1:about 0.7-1.5; the weight ratio of component (a) to component (c) can be about 100-1000:about 1, e.g., about 200-800:about 1.

In an embodiment, in component (a), based on the total weight of component (a), the content of said $C_8$-$C_{20}$ aromatic dibasic acid is about 5-about 75% by weight, e.g., about 30 to about 60% by weight; the content of said $C_2$-$C_{20}$ aliphatic dibasic acid is about 25 to about 95% by weight, e.g., about 40 to about 70% by weight.

The reaction time of said feed stocks for esterification is about 3.5-about 12 h.

In an embodiment, said aliphatic-aromatic copolyester B can be a random copolymer comprising repeated structure unit (I) and repeated structure unit (II),

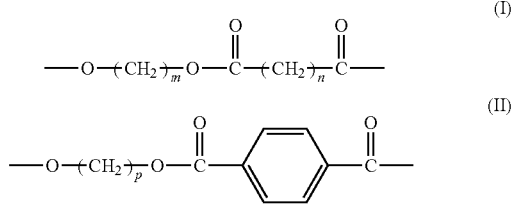

wherein, the molar ratio of structure unit (I) to structure unit (II) is 1:0.1-10, e.g. about 1:about 0.5-2; m is 2-10, e.g. 2-6; n is 2-8, e.g. 2-4; and p is 2-10, e.g., 2-6; and the weight-average molecular weight of said aliphatic-aromatic copolyester B is about 100000 to about 600000, e.g., about 100000 to about 300000.

In an embodiment, the polydispersity index of said aliphatic-aromatic copolyester B can be about 1.2-about 3, e.g., about 1.5 to about 2.5.

Said aliphatic-aromatic copolyester B is linear copolymer. The preparation process of said aliphatic-aromatic copolyester B can substantially identical to that of said aliphatic-aromatic copolyester A except that component (c) (i.e., at least one selected from the group consisting of polyhydric alcohols with functionality greater than about 2, polybasic carboxylic acids with functionality greater than about 2, and polybasic carboxylic anhydrides with functionality greater than about 2 is not added. For the details of the preparation process thereof, CN 1807485A can be referred (especially Examples A7-A9, B6-B21 and C1-C6).

In an embodiment, in the feed stocks comprising a polylactic acid, an aliphatic-aromatic copolyester A, an aliphatic-aromatic copolyester B, and an organic peroxide, based on the total weight of said feed stocks, the content of said polylactic acid can be about 10 to about 90% by weight, e.g., about 45 to about 80% by weight; the content of said aliphatic-aromatic copolyester A can be about 1 to about 85% by weight, e.g., about 5 to about 50% by weight; the content of said aliphatic-aromatic copolyester B can be about 1 to about 85% by weight, e.g., about 5 to about 50% by weight; and the content of said organic peroxide can be about 0.01 to about 2% by weight, e.g., about 0.05 to about 1% by weight;

In an embodiment, in the feed stocks comprising a polylactic acid, an aliphatic-aromatic copolyester A, an aliphatic-aromatic copolyester B, and an organic peroxide, based on the total weight of said feed stocks, the total content of said aliphatic-aromatic copolyester A and said aliphatic-aromatic copolyester B is about 8-about 89% by weight, e.g., about 19-about 54% by weight.

Moreover, in this embodiment, because an aliphatic-aromatic copolyester A and an aliphatic-aromatic copolyester B are simultaneously added during the preparation procedure of the biodegradable composite, not only the insufficient toughening effect resulted by the aliphatic-aromatic copolyester B is avoided, but also the excessive gel effect resulted by the aliphatic-aromatic copolyester A is avoided, thereby the impact resistance and tensile fracture performance of the biodegradable composite can be effectively improved.

In an embodiment of said biodegradable composite, said organic peroxide can be any conventional one functioning to extend chains and improve compatibility. For example, the half-life period of said organic peroxide ($t_{1/2}$) is about 0.2 to about 10 min at a temperature between about 100° C. and about 200° C. In the present invention, said half-life period means the time needed for the organic peroxide in said feed stocks comprising a polylactic acid, an aliphatic-aromatic copolyester A, an aliphatic-aromatic copolyester B, and an organic peroxide to decompose to the extent that its concentration is half of the original one at a temperature between about 100° C. and about 200° C.

In an embodiment, said organic peroxide is one or more selected from the group consisting of dialkyl peroxide, diacyl peroxide, and ester peroxide, e.g. one or more selected from the group consisting of di-cumyl peroxide, 2,5-dimethyl-2,5-di(tert-butyl peroxide)hexane, di(tert-butyl isopropyl peroxide) benzene, dibenzoyl peroxide, lauroyl acyl peroxide, and tert-butyl isobutyrate peroxide.

In an embodiment, said feed stocks comprising a polylactic acid, an aliphatic-aromatic copolyester A, an aliphatic-aromatic copolyester B and an organic peroxide can also contain a slipping agent and/or an antioxidant, and said slipping agent can be one or more selected from the group consisting of erucamide, oleamide, and steramide, Said antioxidant can be any conventional one; e.g., hindered phenol-type antioxidants. Said hindered antioxidant can be triethylene glycol di-β-(3-tert-butyl-4-hydroxyl 5-methylphenyl) propionate, and/or β-(3,5-di-tert-butyl-4-hydoxylphenyl)propanoic actadecanolate. In said feed stocks comprising a polylactic acid, an aliphatic-aromatic copolyester A, an aliphatic-aromatic copolyester B, and an organic peroxide, based on the total weight of said feed stocks, the content of said slipping agent is about 0.01 to about 1% by weight, e.g. about 0.05 to about 0.5% by weight, and the content of said antioxidant is about 0.01 to about 1% by weight, e.g. about 0.05 to about 0.5% by weight.

According to the second aspect of the present invention, a process for preparing a biodegradable composite is provided, which comprises mixing feed stocks comprising a polylactic acid, an aliphatic-aromatic copolyester A, an aliphatic-aromatic copolyester B, and an organic peroxide at a temperature between about 100° C. and about 200° C., which comprises the following steps:

(1) said aliphatic-aromatic copolyester A is formed by the reaction of feed stocks for esterification, which comprise at least one selected from the group consisting of: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ aliphatic dibasic alcohols, (c) at least one selected from the group consisting of polyhydric alcohols with functionality of greater than about 2, polybasic carboxylic acids with functionality of greater than about 2, and anhydrides of polybasic carboxylic acids with functionality of greater than about 2;

(2) mixing feed stocks comprising a polylactic acid, an aliphatic-aromatic copolyester A made in step (1), an aliphatic-aromatic copolyester B and an organic peroxide at a temperature between about 100 and about 200° C., wherein said aliphatic-aromatic copolyester B is a random copolymer comprising repeated structure unit (I) and repeated structure unit (II),

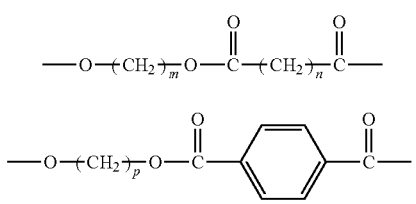

wherein the molar ratio of the repeated structure unit (I) to the repeated structure unit (II) is about 1:about 0.1-10, m is 2-10, n is 2-8, and p is 2-10, and the weight-average molecular weight of said aliphatic-aromatic copolyester B is about 100000 to about 600000.

In said process, in step (1), component (a), (b) and (c) are defined as above.

In an embodiment, said aliphatic-aromatic copolyester A and aliphatic-aromatic copolyester B have a ratio by weight of about 2:8-about 8:2, such as about 3:7-about 7:3, about 4:6-about 6:4.

In step (1), in said feed stocks for esterification, there is no special limitation to the amounts of component (a), component (b), and component (c) in said feed stocks for esterification as long as they can form aliphatic-aromatic copolyesters after said mixing. For example, the molar ratio of component (a) to component (b) can be about 1:about 0.5-2.5. e.g., about 1:about 0.7-1.5; the weight ratio of component (a) to component (c) is about 100-1000:about 1, e.g., about 200-800:about 1.

In an embodiment, in component (a), based on the total weight of component (a), the content of said $C_8$-$C_{20}$ aromatic dibasic acid is about 5 to about 75% by weight, e.g., about 3 to about 60% by weight; the content of said $C_2$-$C_{20}$ aliphatic dibasic acid is about 25-about 95% by weight e.g., about 40 to about 70% by weight.

In an embodiment, in step (1), the process for reacting said feed stocks for esterification can comprise: reacting component (a), component (b), and component (c) in said feed stocks for esterification under esterification conditions and reacting the above reaction products under polycondensation conditions. Said esterification conditions can comprise a reaction temperature between about 150° C. and about 240° C., and a reaction time between about 0.5 h and about 5 h, and said polycondensation conditions can comprise a reaction temperature between about 200° C. and about 300° C., a reaction pressure between about 0 Pa and about 800 Pa, and a reaction time between about 3 h and about 7 h.

In an embodiment, the reaction of component (a), component (b), and component (c) under the reaction conditions comprises: (1) reacting a $C_8$-$C_{20}$ aromatic dibasic acid in component (a) with at least a part of component (b) at the first temperature; (2) reacting the mixture obtained in (1) after reaction with a $C_2$-$C_{20}$ aliphatic dibasic acid, component (c) and the remaining component (b) at the second temperature. Said second temperature can be about 5-about 30° C. higher than the first temperature. For example, said first temperature is about 150-about 225° C., e.g., about 180 to about 210° C.; said second temperature is about 160 to about 240° C., e.g., about 190 to about 230° C. Component (b) added in above (1) can account for about 40 to about 100%, e.g., about 50 to about 80% by weight of the total weight of component (b) added in above (1) and (2).

In step (1), the reaction of said feed stocks for esterification is carried out in the presence of a catalyst, which can be any catalysts conventionally used in the preparation of aliphatic-aromatic copolyesters. For example, said catalyst can comprise: (1) at least one selected from the group consisting of alkoxy titanium, stibonium acetate, zinc acetate, zinc oxides, stibonium oxides, and titanium oxides; (2) at least one selected from the group consisting of dibutyloxotin, tetraethyl tin, triphenylhydroxyl tin, dibutyltin diacitate, diphenyltin dilaurate, monobutyltin trichloride, tributyltin trichloride, dibutyltin sulphide, butylhydroxyltin oxide, methyl stannate, ethyl stannate, and butyl stannate; (3) compounds with a general formula of $RE(R_1)_3$, wherein RE is rare earth metal, $R_1$ is at least one selected from the group consisting of halogen, alkoxy, aryloxy, acetylacetonyl and $R_2COO$-group, $R_2$ is $C_1$-$C_{30}$ alkyls; e.g., they can be at least one selected from the group consisting of lanthanum stearate, lanthanum chloride, lanthanum acetylacetonate, scandium isopropoxide, lanthanum tri(2,6-di-tetra-butyl-4-methylphenyloxide), and cerium acetate.

According to said process of the present invention, in step (2), said polylactic acid, an aliphatic-aromatic copolyester A, an aliphatic-aromatic copolyester B, and an organic peroxide are defined as above.

In an embodiment, in step (2), in said feed stocks comprising a polylactic acid, an aliphatic-aromatic copolyester A, an aliphatic-aromatic copolyester B and an organic peroxide, based on the total weight of said feed stocks, the content of said polylactic acid can be about 10 to about 90% by weight, e.g., about 45 to about 80% by weight, the content of said aliphatic-aromatic copolyester A can be about 1 to about 85% by weight, e.g., about 5 to about 50% by weight; and the content of said aliphatic-aromatic copolyester B can be about 1 to about 85% by weight, e.g., about 5 to about 50% by weight; the content of said organic peroxide is about 0.01 to about 2% by weight, e.g., about 0.05 to about 1% by weight.

In an embodiment, in said feed stocks comprising a polylactic acid, an aliphatic-aromatic copolyester A, an aliphatic-aromatic copolyester B and an organic peroxide, based on said total weight of said feed stocks, the total content of said aliphatic-aromatic copolyester A and aliphatic-aromatic copolyester B is about 8 to about 89% by weight, e.g. about 19 to about 54% by weight.

In an embodiment, in step (2), the temperature for mixing feed stocks comprising a polylactic acid, an aliphatic-aromatic copolyester A, an aliphatic-aromatic copolyester B, and an organic peroxide can be about 100 to about 170° C.

In an embodiment, said feed stocks comprising a polylactic acid, an aliphatic-aromatic copolyester A, an aliphatic-aromatic copolyester B, and an organic peroxide are added into a twin-screw extruder to carry out said mixing, and then tableting. For example, the temperature at various sections from the feed inlet to the outlet of the twin-screw extruder can successively be about 100 to about 105° C., about 165 to about 170° C., about 165 to about 170° C. and about 160 to about 165° C.

In an embodiment, in step (2), the method for mixing said organic peroxide with a polylactic acid, an aliphatic-aromatic copolyester A and an aliphatic-aromatic copolyester B comprises first dissolving an organic peroxide in an organic solvent (such as acetone), and then adding the mixture wherein an organic peroxide are dissolved to the mixture comprising a polylactic acid and an aliphatic-aromatic copolyester A, an aliphatic-aromatic copolyester B, and stirring thoroughly.

In an embodiment, in step (2), said feed stocks comprising a polylactic acid, an aliphatic-aromatic copolyester A, an aliphatic-aromatic copolyester B and an organic peroxide can also comprise a slipping agent and/or an antioxidant, i.e., a slipping agent and/or an antioxidant are added during the preparation of said biodegradable composite. Said slipping agent and antioxidant are identical to those described previously. In said feed stocks comprising a polylactic acid, an aliphatic-aromatic copolyester A, an aliphatic-aromatic copolyester B and an organic peroxide, based on the total weight of said feed stocks, the content of said slipping agent is about 0.01 to about 1% by weight, e.g., about 0.05 to about 0.5% by weight, and the content of said antioxidant is about 0.01 to about 1% by weight, e.g. about 0.05 to about 0.5% by weight.

According to the third aspect of the present invention, a disposable article is provided, which is prepared from a biodegradable composite, and said biodegradable composite is the aforesaid biodegradable composite or the biodegradable composite prepared according to the aforesaid process of the present invention. Said disposable article can be prepared by conventional molding techniques (e.g., extrusion mold blowing, membrane drawing, bottle blowing, injection molding, foaming, tableting, etc.)

EXAMPLES

Some embodiments are further exemplified as follows, but the protection scope of the invention is not limited by them.

Example 1

(1) Preparation of Aliphatic-Aromatic Copolyester (i.e. Aliphatic-Aromatic Copolyester A)

Catalyst: based on the total weight of the catalyst, the catalyst comprises 57.8% by weight of lanthanum stearate (prepared according to the process in Example AS of CN 1807485A), 23.2% by weight of tetrabutyl titaniate (purchased from Beijing Chemicals Co.), 10.0% by weight of dibutyltin oxide (purchased from Beijing Third Chemical Plant), and 9.0% by weight of triphenylhydroxy tin (purchased from Beijing Chemicals Co.).

1.72 mol p-phthalic acid (285.2 g), 2.78 mol 1,4-butylene glycol, and 1.058 g aforesaid catalyst were added to a 2.5 L reactor, which was heated while stirring in an atmosphere of nitrogen until reflux took place. The temperature was adjusted to 230° C. and the reaction proceeded at this temperature for about 100 min. When the water formed in the reaction was completely vaporized, 1.86 mol 1,4-succinic acid (220 g), 2.22 mol 1,4-butanediol, and 1.3 g pentacythritol were added and heating was continued until reflux took place. The temperature was adjusted to 200° C. and the reaction proceeded at this temperature for about 100 min. When the water produced in the reaction was completely vaporized, the pressure in the reactor was adjusted to below 200 Pa, and the temperature was adjusted to 240° C. to carry out polycondensation at this pressure and this temperature for 4 h, yielding a yellowish polymer A1.

(2) Preparation of Aliphatic-Aromatic Copolyester (i.e. Aliphatic-Aromatic Copolyester B)

Copolyester B1 was prepared according to the process in Example B6 of CN 1807485A, the mole ratio of the aliphatic structure unit to the aromatic structure unit in this copolyester was about 1:1. The weight-average molecular weight of this copolyester was 140000, and the polydispersity index was 2.05 measured by Gel Permeation Chromatography (GPC).

(3) Preparation of Biodegradable Composite Material 300 g poly L-lactic acid (PLLA) (4042D, purchased from Nature Works LLC Co.), 40 g polymer A1 prepared in (1), and 160 g copolyester B1 prepared in (2) were weighed and uniformly mixed, then 0.5 g erucamide (purchased from Beijing Xingbeida Chemical Material Co. Ltd), and 1.0 g 2,5-dimethyl-2,5-di(tert-bytul) hexane peroxide (purchased from Tonglian Chemical Co. Ltd, $t_{1/2}$=1 min at 177° C.) were added successively. These materials were mixed and stirred and the mixed materials were extruded through a twin-screw extruder (the temperature at various sections from the inlet to the outlet of the extruder was controlled at 100° C., 170° C., 170° C., and 165° C. successively) and pelletized, yielding a biodegradable composite. The biodegradable composite was melted and tableted, yielding composite sheets S1.

Example 2

(1) Preparation of Aliphatic-Aromatic Copolyester (i.e. Aliphatic-Aromatic Copolyester A)

Catalyst: based on the total weight, the catalyst comprises 57.8% by weight of lanthanum stearate (prepared according to the process in Example AS of CN 1807485A), 23.2% by weight of tetrabutyl titaniate (purchased from Beijing Chemicals Co.), 10.0% by weight of dibutyltin oxide (purchased from Beijing Third Chemical Plant), and 9.0% by weight of triphenylhydroxy tin (purchased from Beijing Chemicals Co.).

0.72 mol p-phthalic acid (119.5 g), 1 mol dimethyl phthalate (194.2 g), 2.55 mol 1,3-propylene glycol, and 1.058 g aforesaid catalyst were added to a 2.5 L reactor, which was heated while stirring in an atmosphere of nitrogen until reflux took place. The temperature was adjusted to 230° C. and the reaction proceeded at this temperature for about 100 min. When the water produced in the reaction was completely vaporized, 1.38 mol 1,6-adipic acid (201.5 g), 2.10 mol 1,3-propylene glycol, and 2.5 g 1,2.4.5-benzenetetracarboxylic acid (purchased from Tianjin Jinrei Chemical Co. Ltd.) were added and heating was continued until reflux took place. The temperature was adjusted to 200° C. and the reaction proceeded at this temperature for about 100 min. When the water produced in the reaction was completely vaporized, the pressure in the reactor was adjusted to below 200 Pa, and the temperature was adjusted to 240° C. to carry out polycondensation at this pressure and this temperature for 4 h, yielding a yellowish polymer A2.

(2) Preparation of Aliphatic-Aromatic Copolyester (i.e. Aliphatic-Aromatic Copolyester B)

Copolyester B2 was prepared according to the process in Example B17 of CN 1807485A, wherein the mole ratio of the aliphatic structure unit to the aromatic structure unit in this copolyester was about 60:40. The weight-average molecular weight of this copolyester was 116000, and the polydispersity index was 1.88 measured by Gel Permeation Chromatography (GPC)

(3) Preparation of Biodegradable Composite Material 300 g polyL-lactic acid (PLLA) (4042D, purchased from Nature Works LLC Co.), 80.0 g polymer A2 prepared in (1), and 120 g copolyester B2 prepared in (2) were weighed and uniformly mixed, then 0.5 g erucamide (purchased from Beijing Xingbeida Chemical Material Co. Ltd), and 0.5 g triglycol di-β(3-tert-butyl-4-hydroxy-5-methylphenyl) propionate (purchased from Guangzhou Lunlichi Chemicals Co. Ltd.) and 1.0 g di(tert-butyl peroxy-isopropyl) benzene (purchased from Shanghai Shangjing Commercial Co. Ltd, $t_{1/2}$=1 min at 185° C.) were added successively. These materials were mixed and stirred, and the mixed materials were extruded through a twin-screw extruder (the temperature at various sections from the feed inlet to the outlet of the extruder was controlled at 100° C., 170° C., 170° C., and 165° C. successively) and pelletized, yielding a biodegradable composite. The biodegradable composite was then melted and tabletted, yielding composite sheets S2.

Example 3

(1) Preparation of Aliphatic-Aromatic Copolyester (e.g., Aliphatic-Aromatic Copolyester A)

Catalyst: based on the total weight of the catalyst, the catalyst comprises 57.8% by weight of lanthanum stearate (prepared according to the process in Example A5 of CN 1807485A), 23.2% by weight of tetrabutyl titaniate (purchased from Beijing Chemicals Co.), 10.0% by weight of dibutyltin oxide (purchased from Beijing Third Chemical Plant), and 9.0% by weight of triphenylhydroxy tin (purchased from Beijing Chemicals Co.).

2 mol p-phthalic acid (332 g), 1.8 mol 1,4-butylene glycol, and 1.058 g aforesaid catalyst were added to a 2.5 L reactor, which were heated while stirring in an atmosphere of nitrogen until reflux took place. The temperature was adjusted to 230° C. and the reaction proceeded at this temperature for about 100 min. When the water produced in the reaction was completely vaporized, 2.5 mol 1,3-propane diacid (260 g), 1.8 mol 1,4-butylene glycol, and 2.0 g hydoxysuccinic acid (purchased from Guangzhou Kainuo Chemical Co. Ltd.) were added and heating was continued until reflux took place. The temperature was adjusted to 200° C. and the reaction proceeded at this temperature for about 100 min. When the water produced in the reaction was completely vaporized, the pressure in the reactor was adjusted to bellow 200 Pa, and the temperature was adjusted to 240° C. and polycondensation was carried out at this pressure and this temperature for 7 h, yielding a yellowish polymer A3.

(2) Preparation of Aliphatic-Aromatic Copolyester (i.e. Aliphatic-Aromatic Copolyester B)

Copolyester B3 was prepared according to the process in Example B18 of CN 1807485A, wherein the mole ratio of the aliphatic structure unit to the aromatic structure unit in this copolyester was about 67:33. The weight-average molecular weight of this copolyester was 136000, and the polydispersity index was 2.23 measured by Gel Permeation Chromatography (GPC)

(3) Preparation of Biodegradable Composite Material 300 g poly L-lactic acid (PLLA) (4042D, purchased from Nature Works LLC Co.), 100 g polymer A3 prepared in (1), and 100 g copolyester B3 prepared in (2) were weighed and uniformly mixed, then 0.5 g erucamide (purchased from Beijing Xingbeida Chemical Material Co. Ltd), and 1.0 g tert-butyl isobutyrate peroxide (purchased from Lanzhou Auxiliary Plant, $t_{1/2}$=6 min at 118° C.) were added successively. These materials were mixed and stirred, and the mixed materials were extruded through a twin-screw extruder (the temperature at various sections from the feed inlet to the outlet of the extruder was controlled at 100° C., 170° C., 170° C., and 165° C. successively) and pelletized, yielding a biodegradable composite. The biodegradable composite was then melted and tabletted, yielding composite sheets S3.

Example 4

A biodegradable composite material was prepared according to the process in Example 3, except that, in the procedure for preparing the biodegradable composite material, the amount of the aliphatic-aromatic copolyester B was 90 g, and the amount of the aliphatic-aromatic copolyester A was 110 g, thereby yielding composite sheets S4.

Example 5

A biodegradable composite material was prepared according to the process in Example 3, except that, in the procedure for preparing the biodegradable composite material, the amount of the aliphatic-aromatic copolyester B was 80 g, and the amount of the aliphatic-aromatic copolyester A was 120 g, thereby yielding composite sheets S5.

Example 6

A biodegradable composite material was prepared according to the process in Example 3, except that, in the procedure for preparing the biodegradable composite material, the amount of said aliphatic-aromatic copolyester B was 40 g, and the amount of the aliphatic-aromatic copolyester A was 160 g, thereby yielding composite sheets S6.

Test Example

Measurement of melting index (MI): the melt flow rates of the biodegradable composites obtained in Examples 1-6 were measured under 190° C. and a load of 2.16 kg according to the method of ISO1133-2005 using CS-127 type melt index instrument provided by Scientific Instrument Manufacturing Co., USA.

The tensile yield stress, tensile failure stress, and elongation at break of the composite sheets S1-S6 were measured according to method GB/T 1040.2-2006;

Simply-supported notch impact strength of the composite sheets S1-S6 was measured according to method GB/T 1043.1-2008;

The biodegradation performance of the plastic particles of the composite sheets S1-S6 was measured according to method GB/T 20197-2006.

The results of the above measurements are shown in the following Table 1.

The above particular examples are only used to describe some embodiments of the present invention, but the present invention is not limited to them. The technical embodiments of the present invention can be modified within the scope of the present invention, and the variant thereof is still within the protection scope of the present invention.

TABLE 1

|  | Composite sheet | Copolyester (%) | | Tensile yield stress (MPa) | Tensile failure stress (MPa) | Elongation at break (%) | Simply-supported notch impact strength (kJ/m$^2$) | Melt flow rate (g/10 min) | 90 day degradation rate % |
|---|---|---|---|---|---|---|---|---|---|
|  |  | Copolyester A (%) | Copolyester B (%) |  |  |  |  |  |  |
| Example 1 | S1 | 20 | 80 | 33.2 | 20.8 | 280.5 | 5.50 | 9.5 | 61.89 |
| Example 2 | S2 | 40 | 60 | 37.8 | 26.6 | 380.1 | 5.80 | 9.1 | 64.76 |
| Example 3 | S3 | 50 | 50 | 38.2 | 25.3 | 400.2 | 6.20 | 9.0 | 64.33 |
| Example 4 | S4 | 55 | 45 | 35.4 | 21.7 | 442.8 | 5.80 | 9.2 | 63.89 |
| Example 5 | S5 | 60 | 40 | 38.0 | 24.5 | 390.5 | 6.00 | 9.2 | 63.57 |
| Example 6 | S6 | 80 | 20 | 35.4 | 23.9 | 350.3 | 5.90 | 9.5 | 62.85 |

We claim:

1. A biodegradable composite prepared using a first feedstock comprising a polylactic acid, an aliphatic-aromatic copolyester A, an aliphatic-aromatic copolyester B, and an organic peroxide at a temperature between about 100° C. and about 200° C., wherein, based on the total weight of said first feedstock, a content of the polylactic acid is about 45% to about 90% by weight, wherein said aliphatic-aromatic copolyester A is formed by using an esterification feedstock comprising: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ alicyclic dibasic alcohols, (c) at least one selected from the group consisting of polyhydric alcohols with functionality of greater than about 2, polybasic carboxylic acids with functionality of greater than about 2, and anhydrides of polybasic carboxylic acids with functionality of greater than about 2, wherein said aliphatic-aromatic copolyester B is a random copolymer comprising structure unit (I) and structure unit (II),

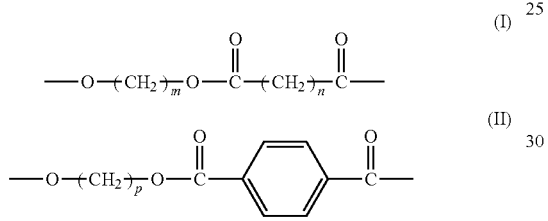

wherein the molar ratio of structure unit (I) to structure unit (II) is about 1 to about 0.1-10, wherein m is an integer of from 2 to 10, wherein n is an integer of from 2 to 8, and wherein p is an integer of from 2 to 10, and wherein the weight-average molecular weight of said aliphatic-aromatic copolyester B is about 100000 to about 600000, wherein a weight ratio between said aliphatic-aromatic copolyester A and said aliphatic-aromatic copolyester B is about 4:6 to about 8:2.

2. The composite according to claim 1, wherein based on the total weight of said first feedstock, the content of said polylactic acid is about 60% to about 90% by weight, a content of said aliphatic-aromatic copolyester A is about 1% to about 85% by weight, a content of said aliphatic-aromatic copolyester B is about 1% to about 85% by weight and a content of said organic peroxide is about 0.01% to about 2% by weight.

3. The composite according to claim 2, wherein based on the total weight of the first feedstock, the total content of said aliphatic-aromatic copolyester A and said aliphatic-aromatic copolyester B is about 8% to about 89% by weight.

4. The composite according to claim 1, wherein said polylactic acid is L-polylactic acid or a mixture of L-polylactic acid with D-polylactic acid, and the content of L-polylactic acid in said polylactic acid is about 50% to about 100% by weight.

5. The composite according to claim 1, wherein the weight ratio between said aliphatic-aromatic copolyester A and said aliphatic-aromatic copolyester B is about 4:6 to about 6:4.

6. The composite according to claim 1, wherein in said esterification feedstock, the molar ratio of component (a) to component (b) is about 1 to about 0.5-2.5 and the weight ratio of component (a) to component (c) is about 100-1000 to about 1, wherein in component (a), based on the total weight of component (a), a content of said $C_8$-$C_{20}$ aromatic dibasic acids is about 5% to about 75% by weight, a content of said $C_2$-$C_{20}$ aliphatic dibasic acids is about 25% to about 95% by weight, and wherein the esterification reaction time of said esterification feedstock is about 3.5 h to about 12 h.

7. The composite according to claim 1, wherein, in said esterification feedstock, said $C_8$-$C_{20}$ aromatic dibasic acid is one or more selected from the group consisting of $C_8$-$C_{20}$ aromatic dibasic acids, $C_8$-$C_{20}$ aromatic dibasic acid anhydrides, esters of $C_8$-$C_{20}$ aromatic dibasic acids, m-phthalic acid, dimethyl m-phthalate, p-phthalic acid, dimethyl p-phthalate, o-phthalic acid, dimethyl o-phthalate, o-phthalic anhydride, 2,6-naphthalene dicarboxylic acid, dimethyl 2,6-naphthalene dicarboxylate, 1,5-naphthalene dicarboxylic acid, dimethyl 1,5-naphthalene dicarboxylate, 2,7-naphthalene dicarboxylic acid, dimethyl 2,7-naphthalene dicarboxylate, 4,4'-biphenyldicarboxylic acid, dimethyl 4,4'-biphenyldicarboxyate, 3,4'-biphenyldicarboxylic acid, and dimethyl 3,4'-biphenyldicarboxylate, said $C_2$-$C_{20}$ aliphatic dibasic acid is one or more selected from the group consisting of $C_2$-$C_{20}$ aliphatic dibasic acids, $C_3$-$C_{10}$ alicyclic dibasic acids, the esters and acid anhydrides thereof, succinic acid, succinic anhydride, dimethyl adipate, adipic acid, adipic anhydride, azelaic acid, sebacic acid, dodecanedicarboxylic acid, 1,4-cyclohexanedicarboxylic acid, 1,2,4,5-cyclohexanetetracarboxylic dianhydride, dimethyl 1,4-cyclohexanedicaboxylate, and norbornanedicarboxylic acid, component (b) is at least one selected from the group consisting of $C_2$-$C_{10}$ aliphatic dibasic alcohols and/or $C_5$-$C_{10}$ alicyclic dibasic alcohols, ethylene glycol, diethylene glycol, propanediol, butanediol, pentanediol, hexanediol, cyclohexanediol, and norbornanedimethanol, and component (c) is one or more selected from the group consisting of tartaric acid, citric acid, hydroxybutanediacid, trimethylolpropane, trimethylolethane, pentaerythritol, polyethertriol, glycerol, 1,3,5-benzenetriacid, trimellitic acid, trimellitic anhydride, pyromellitic acid, pyromellitic acid dianhydride, hydroxy-m-benzenediacid, glycerol, pentaerythritol, and pyromellitic acid dianhydride.

8. The composite according to claim 1, wherein polydispersity index of said aliphatic-aromatic copolyester B is about 1.2 to about 3.

9. The composite according to claim 1, wherein the half-life of said organic peroxide at a temperature between about 100° C. and about 200° C. is about 0.2 to about 10 min, and said organic peroxide is one or more selected from the group consisting of dialkyl peroxide, diacyl, peroxide, and ester peroxide, di-cumyl peroxide, 2,5-dimethyl-2,5-di(tert-butyl peroxide)hexane, di(tert-butyl isopropyl peroxide) benzene, dibenzoyl peroxide, lauroyl acyl peroxide, and tert-butyl isobutyrate peroxide.

10. The composite according to claim 1, wherein said first feedstock further comprises a slipping agent and/or an antioxidant, and said slipping agent is one or more selected from the group consisting of erucamide, oleamide, and steramide; said antioxidant is one or more selected from the group consisting of hindered phenol-type antioxidants, triethylene glycol, di-β-(3-tert-butyl-4-hydroxyl-5-methylphenyl) propionate, and β-(3,5-di-tert-butyl-4-hydoxyphenyl)propanoic actadecanolate.

11. The composite according to claim 10, wherein based on the total weight of said first feedstock, the content of said slipping agent is about 0.01% to about 1% by weight, and the content of said antioxidant is about 0.01% to about 1% by weight.

12. A process for preparing biodegradable composites, comprising the steps of:
(1) reacting an esterification feedstock to form an aliphatic-aromatic copolyester A, said esterification feedstock comprises at least one selected from the group consisting of: (a) $C_8$-$C_{20}$ aromatic dibasic acids and $C_2$-$C_{20}$ aliphatic dibasic acids, (b) $C_2$-$C_{20}$ aliphatic dibasic alcohols and/or $C_3$-$C_{10}$ aliphatic dibasic alcohols, (c) at least one selected from the group consisting of polyhydric alcohols with functionality of greater than 2, polybasic carboxylic acids with functionality of greater than 2, and anhydrides of polybasic carboxylic acids with functionality of greater than 2;
wherein step (1) further comprising an esterification reaction comprising reacting component (a) and at least a part of component (b) to obtain a first mixture, and reacting the first mixture with component (c) and the remaining component (b),
(2) reacting a first feedstock comprising a polylactic acid, an aliphatic-aromatic copolyester A made in step (1), an aliphatic-aromatic copolyester B and an organic peroxide at a temperature between about 100° C. and about 200° C., wherein said aliphatic-aromatic copolyester B is a random copolymer comprising structure unit (I) and structure unit (II),

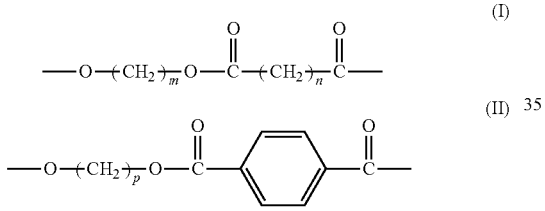

wherein the molar ratio of the structure unit (I) to the structure unit (II) is about 1 to about 0.1-10, m is an integer of from 2 to 10, n is an integer of from 2 to 8, and p is an integer of from 2 to 10, and the weight-average molecular weight of said aliphatic-aromatic copolyester B is about 100000 to about 600000,
wherein a weight ratio between said aliphatic-aromatic copolyester A and said aliphatic-aromatic copolyester B is about 4:6 to about 8:2.

13. The process according to claim 12, wherein, in step (2), based on the total weight of the first feedstock, a content of said polylactic acid is about 10% to about 90% by weight, a content of said aliphatic-aromatic copolyester A is about 1% to about 85% by weight, a content of said aliphatic-aromatic copolyester B is about 1% to about 85% by weight, and a content of said organic peroxide is about 0.01% to about 2% by weight.

14. The process according to claim 13, wherein, in step (2), based on the total weight of the first feedstock, the total content of said aliphatic-aromatic copolyester A and said aliphatic-aromatic copolyester B is about 8% to about 89% by weight.

15. The process according to claim 12, wherein said polylactic acid is L-polylactic acid or a mixture of L-polylactic acid with D-polylactic acid, and the content of L-polylactic acid in said polylactic acid is about 50% to about 100% by weight.

16. The process according to claim 12, wherein the weight ratio between said aliphatic-aromatic copolyester A and said aliphatic-aromatic copolyester B is about 4:6 to about 6:4.

17. The process according to claim 12, wherein, in said esterification feedstock, the molar ratio of component (a) to component (b) is about 1 to about 0.5-2.5, the weight ratio of component (a) to component (c) is about 100-1000 to about 1, wherein in component (a), based on the total weight of component (a), the content of said $C_8$-$C_{20}$ aromatic dibasic acid is about 5% to about 75% by weight, the content of said $C_2$-$C_{20}$ aliphatic dibasic acid compound is about 25% to about 95% by weight.

18. The process according to claim 12, wherein in said esterification feedstock, said $C_8$-$C_{20}$ aromatic dibasic acid is one or more selected from the group consisting of $C_8$-$C_{20}$ aromatic dibasic acids, $C_8$-$C_{20}$ aromatic dibasic acid anhydrides, and esters of $C_8$-$C_{20}$ aromatic dibasic acids, m-phthalic acid, dimethyl m-phthalate, p-phthalic acid, dimethyl p-phthalate, o-phthalic acid, dimethyl o-phthalate, phthalic anhydride, 2.6-naphthalene dicarboxylic acid, dimethyl 2,6-naphthalene dicarboxylate, 1,5-naphthalene dicarboxylic acid, dimethyl 1,5-naphthalene dicarboxylate, 2,7-naphthalene dicarboxylic acid, dimethyl 2,7-naphthalene dicarboxylate, 4,4'-biphenyl dicarboxylic acid, dimethyl 4,4'-biphenyl dicarboxylate, 3,4'-biphenyldicarboxylic acid, and dimethyl 3,4'-biphenyl dicarboxylate,
said $C_2$-$C_{20}$ aliphatic dibasic acid is one or more selected from the group consisting of $C_2$-$C_{20}$ aliphatic dibasic acids, $C_3$-$C_{10}$ alicyclic dibasic acids, the esters and acid anhydrides thereof, succinic acid, succinic anhydride, dimethyl adipate, dimethyl adipate, adipic acid, adipic anhydride, azelaic acid, sebacic acid, dodecanedicarboxylic acid, 1,4-cyclohexanedicarboxylic acid, 1,2,4,5-cyclohexanetetracarboxylic dianhydride, dimethyl 1,4-cyclohexanedicarboxylic acid, and norbornanedicarboxylic acid,
component (b) is one or more selected from the group consisting of $C_2$-$C_{10}$ aliphatic dibasic alcohols, alicyclic dibasic alcohols, ethylene glycol, diethylene glycol, propanediol, butanediol, pentanediol, hexanediol, cyclohexanediol, and norbornanedimethanol, and
component (c) is one or more selected from the group consisting of tartaric acid, citric acid, hydroxybutanediacid, trimethylolpropane, trimethylolethane, pentaerythritol, polyethertriol, glycerol, 1,3,5-benzenetriacid, trimellitic acid, trimellitic anhydride, pyromellitic acid, pyromellitic acid dianhydride, and hydroxy-m-benzenediacid, glycerol, pentaerythritol, and pyromellitic acid dianhydride.

19. The process according to claim 12, wherein step (1) further comprising a polycondensation reaction.

20. The process according to claim 19, wherein said esterification reaction is carried out at a reaction temperature between about 150° C. and about 240° C., a reaction time between about 0.5 h and about 5 h, and said polycondensation reaction is carried out at a reaction temperature between about 200° C. and about 300° C., a reaction pressure between about 0 Pa and about 800 Pa, and a reaction time between about 3 h and about 7 h.

21. The process according to claim 12, wherein the polydispersity index of said aliphatic-aromatic copolyester B is about 1.2 to about 3.

22. The process according to claim 12, wherein the half-life of said organic peroxide at temperatures between about 100° C. and about 200° C. is about 0.2 to about 10 min, and it is one or more selected from the group consisting of dialkyl peroxide, diacyl peroxide, ester peroxide, di-cumyl peroxide, 2,5- dimethyl-2,5-di(tert-butyl peroxide)hexane, di(tert-butyl isopropylperoxy) benzene, dibenzoyl peroxide, lauroyl acyl peroxide, and tert-butyl isobutyrate peroxide.

23. The process according to claim 12, wherein, in step (2), said first feedstock further comprises a slipping agent and/or an antioxidant, wherein said slipping agent is one or more selected from the group consisting of erucamide, oleamide, and steramide; and said antioxidant is selected from the group consisting of hindered phenol-type antioxidants, triethylene glycol, di-β-(3-tert-butyl-4-hydroxyl-5-methylphenyl) propionate, and β-(3,5-di-tert-butyl-4-hydoxylphenyl)propanoic actadecanolate.

24. The process according to claim 23, wherein, in step (2), based on the total weight of the first feedstock, the content of said slipping agent is about 0.01% to about 1% by weight, and the content of said antioxidant is about 0.01% to about 1% by weight.

25. A disposable article produced from biodegradable composites, wherein said biodegradable composite is a biodegradable composite according to claim 1.

26. A disposable article produced from biodegradable composites, wherein said biodegradable composite is a biodegradable composite according to claim 12.

* * * * *